(12) United States Patent
Lurie (10) Patent No.: US 10,482,031 B1
(45) Date of Patent: Nov. 19, 2019

(54) METHOD AND SYSTEM FOR RECONSTRUCTING VIRTUAL ADDRESS FROM PHYSICAL MEMORY

(71) Applicant: CADENCE DESIGN SYSTEMS, INC, San Jose, CA (US)

(72) Inventor: Yoav Lurie, Zichron Yaakov (IL)

(73) Assignee: Cadence Design Systems, Inc., San Jose, CA (US)

( * ) Notice: Subject to any disclaimer, the term of this patent is extended or adjusted under 35 U.S.C. 154(b) by 362 days.

(21) Appl. No.: 15/246,726

(22) Filed: Aug. 25, 2016

(51) Int. Cl.
*G06F 12/1027* (2016.01)
*G06F 12/1009* (2016.01)

(52) U.S. Cl.
CPC ...... *G06F 12/1027* (2013.01); *G06F 12/1009* (2013.01); *G06F 2212/68* (2013.01)

(58) Field of Classification Search
None
See application file for complete search history.

(56) References Cited

U.S. PATENT DOCUMENTS

| | | | | |
|---|---|---|---|---|
| 5,278,961 A * | 1/1994 | Mueller | ............ | G06F 12/1009 711/206 |
| 6,079,003 A * | 6/2000 | Witt | .................. | G06F 9/30152 711/200 |
| 9,959,214 B1 * | 5/2018 | Habusha | ............ | G06F 12/1009 |
| 2015/0100753 A1 * | 4/2015 | Shen | .................. | G06F 12/1027 711/207 |

* cited by examiner

*Primary Examiner* — Michael Alsip
(74) *Attorney, Agent, or Firm* — Pearl Cohen Zedek Latzer Baratz LLP (57) ABSTRACT

A method for retrieving a virtual address from a physical address accesses in a memory of a computing system, to which that virtual address was previously mapped to, may include: using a monitor to intercept transmissions to and from a memory of a computing system; using a processor: identifying in the intercepted transmissions page table address calls relating to mapping of a virtual address to a physical address; and retrieving the virtual address from the identified page table address calls.

14 Claims, 7 Drawing Sheets

| A | B | C | D | E |
|---|---|---|---|---|
| 101010101 | 000100101 | 110110011 | 101010001 | 001000110100 |
| 155 | 25 | 1b3 | 151 | 234 |

Fig. 1

Prior Art

METHOD AND SYSTEM FOR RECONSTRUCTING VIRTUAL ADDRESS FROM PHYSICAL MEMORY

FIELD OF THE INVENTION

The present invention relates to memory management in computing systems. More specifically the present invention relates to system and method for reconstructing a virtual memory address from a physical memory address that was previously mapped to that virtual memory address.

BACKGROUND OF THE INVENTION

In a computing system that has memory management, a virtual address—e.g., the address which software works with, might differ from the physical address, e.g., which is the physical location of data in the random access memory (RAM).

In a computing system that uses virtual memory, a memory management unit (MMU) can coordinate and/or control all, or substantially all, of the memory resources, by, for example, assigning blocks to various running processes to optimize system performance. The MMU can map (e.g., "translate") virtual addresses to physical addresses, allowing every running process to enjoy available memory as if all, or substantially all, of the primary storage is free for the MMU to use.

Typically, a computer application running on a computing device uses commands that ultimately cause information to be read or written in a memory of the device. For example, a computer application may initiate a read or write command to an address in the memory, e.g. 1000 (or 3E8, in hexadecimal notation). There can be situations where two or more software applications are executed concurrently (typically there are many applications that are concurrently run on a computing device). Specifically, there may be an instance where the same address in memory is called by different software applications. This may unavoidably lead to malfunction and crashes.

In order to avoid contradicting calls to the same address in memory, virtual addresses can be used. A page table, e.g., a data structure map, can be used by a virtual memory system in a computer system to associate between virtual addresses and actual, physical addresses of the memory of the computing device. The virtual addresses are used by software applications (also referred to as "processes"), while the hardware governed by the operating system can use the physical addresses of the memory.

SUMMARY OF THE INVENTION

There is thus provided, in accordance with some embodiments of the present invention, a method for retrieving a virtual address from a physical address in a memory of a computing system, to which that virtual address was previously mapped. The method may include: intercepting transmissions to and from a memory of a computing system. The method may also include, using a processor: identifying in the intercepted transmissions page table address calls that relate to mapping of a virtual address to a physical address; and retrieving the virtual address from the identified page table address calls.

According to some embodiments of the invention the method, wherein retrieving of the virtual address from the identified page table address calls, may include retrieving bits of the physical address from tails of least significant bits of the identified page table address calls.

In some embodiments retrieving of the virtual address from the identified page table address calls may be based on a chronological order of the identified page table address calls, knowledge of a number of page table steps that was required in mapping of the virtual address to the physical address, and knowledge of a translation table base register relating to the memory of the computing system.

In some embodiments where the computing system is operating with more than one operating system, the retrieving of the virtual address from the identified page table address calls may further include retrieving an address that is within an address range corresponding to a virtual translation table base register, and using that virtual translation table base register in retrieving the virtual address.

According to some embodiments of the invention, retrieving of the virtual address from the identified page table address calls may include retrieving bits of the physical address from tails of least significant bits of every "n"th page table address call of the identified page table address calls, "n" being an integer that is equal to a number of slices in a form the virtual address is presented.

In some embodiments the computing system may be selected from the group of systems consisting of system on chip, simulation of a device under test, and emulation of a device under test.

In some embodiments the monitor may be part of an interconnect validator device.

In accordance with some embodiments of the invention there is also provided a system for retrieving a virtual address from a physical address in a memory of a computing system, to which that virtual address was previously mapped to. The system may include: a monitor configured to intercept transmissions to and from a memory of a computing system; and a processor configured to: identify in the intercepted transmissions page table address calls that relate to mapping of a virtual address to a physical address; and to retrieve the virtual address from the identified page table address calls.

In accordance with some embodiments of the invention there is further provided a non-transitory computer readable storage medium for retrieving a virtual address from a physical address in a memory of a computing system, to which that virtual address was previously mapped to, having stored thereon instructions that when executed by a processor will cause the processor to: intercept transmissions to and from a memory of a computing system; identify in the intercepted transmissions page table address calls relating to mapping of a virtual address to a physical address; and retrieve the virtual address from the identified page table address calls.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although the examples disclosed and discussed herein are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method examples described herein are not constrained to a particular order or sequence. Additionally, some of the described method examples or elements thereof can occur or be performed at the same point in time.

Unless specifically stated otherwise, as is apparent from the following discussions, it is appreciated that throughout the specification, discussions utilizing terms such as "adding", "associating" "selecting," "evaluating," "processing," "computing," "calculating," "determining," "designating," "allocating" or the like, refer to the actions and/or processes of a computer, computer processor or computing system, or similar electronic computing device, that manipulate, execute and/or transform data represented as physical, such as electronic, quantities within the computing system's registers and/or memories into other data similarly represented as physical quantities within the computing system's memories, registers or other such information storage, transmission or display devices.

The present invention relates to computing devices that use an operating system that supports virtual addresses.

Figure 1:
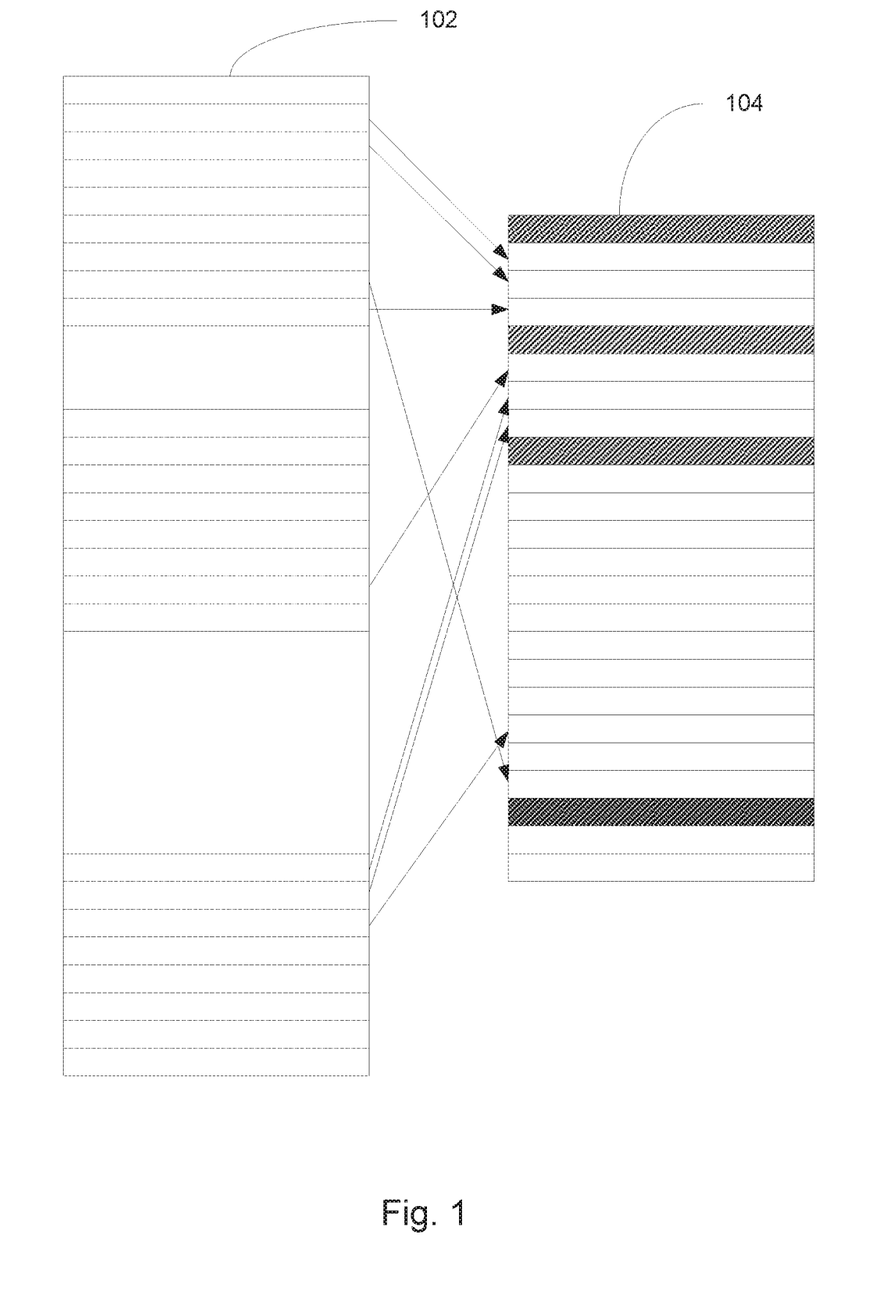
FIG. 1 illustrates a relations between a virtual address space and a physical address space, showing relationships between pages addressed by virtual addresses and the pages in physical memory (prior art)

FIG. 1 is a diagram illustrating relationships between a virtual address space 102 and a physical address space 104, showing relationships between pages addressed by virtual addresses and the pages in a physical memory (linked by the arrows) in a simple address scheme. In operating systems that use virtual memory, typically, each of the processes running on a computing device is supposedly working with large contiguous sections of memory. Physically, the memory allocated for each process may be distributed across different parts of the physical memory, and may be moved to another storage device (e.g., a hard disk drive). When a process requests access to data stored in a certain address (e.g., a virtual address), the operating system may map the virtual addresses provided by each of the processes to physical addresses in the memory, where the requested data is actually stored. The mapping can be saved in a page table form. The page table may include a mapping between a virtual address of a page and the address of a physical frame that holds the data for that virtual address.

A memory management unit of the computing device may store a cache of recently used mappings from the operating system's page table—this is typically called the translation lookaside buffer (TLB). When a virtual address provided by a process needs translating into a physical address, the TLB is typically accessed first. If a match is found (this may be termed a "TLB hit") the corresponding physical address is returned. If there is no match (e.g., a TLB miss) the handler can look up the address mapping in the page table to determine whether a mapping exists. This is carried out in a process referred to as "page table walk".

Figure 2A:
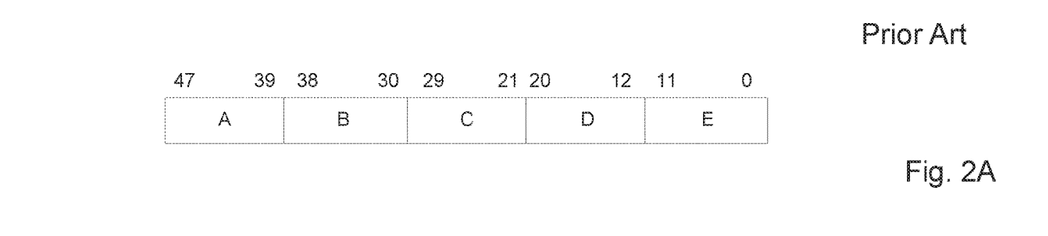
FIG. 2A shows the structure of a virtual address.
Figure 2B:
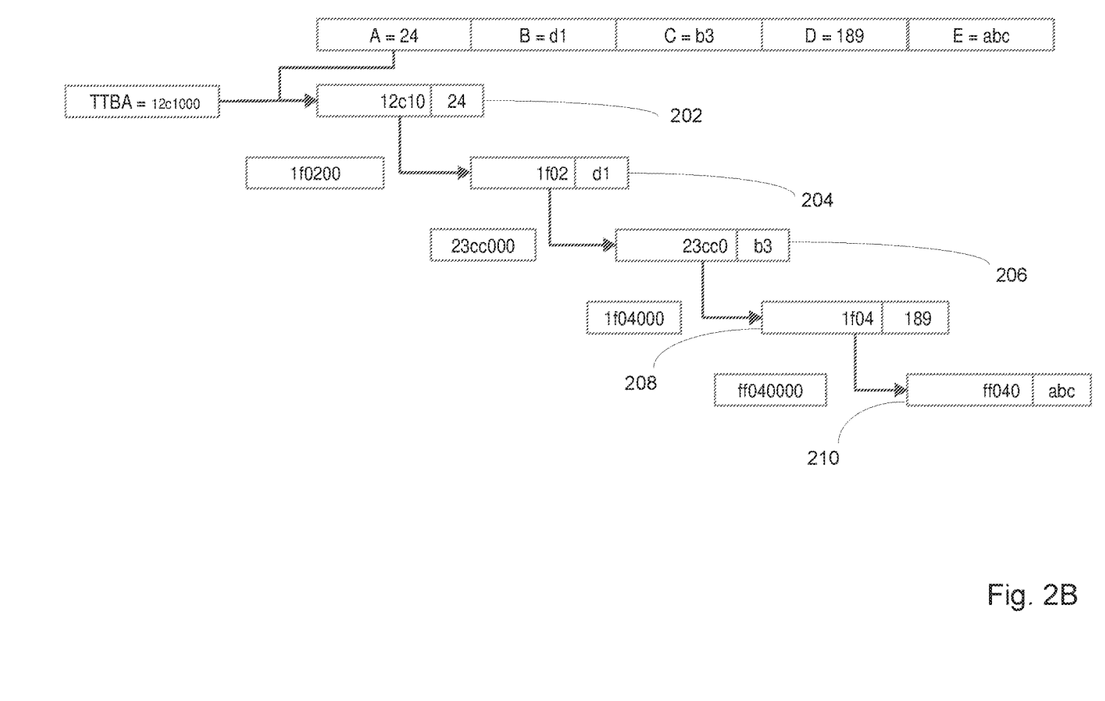
FIG. 2B depicts an example of page table walk conducted to translate a virtual memory into a physical memory (prior art)

Example of page table walk conducted to translate a virtual memory into a physical memory is depicted in FIGS. 2A and 2B (prior art).

An example for a structure of a 48 bit virtual address is presented in FIG. 2A, divided into five slices A, B, C, D and E. This is given just as an example Some embodiments of system and method according to the present invention may be implemented for virtual addresses designed for a 32-bit system, 64-bit system or other formats. Typically, the notation is hexadecimal, where the most significant bits (MSB—the bits of representing the greatest value)—is in slice A of the address on the left-hand side, whereas the least significant bits (LSB—the bits representing the lowest values) is in slice E on the right-hand side.

FIG. 2A shows the structure of a virtual address. Details of the structure may vary between implementations and can be accommodated by changing the configuration of the translation mechanism.

A page table walk is demonstrated in FIG. 2B, with reference to the virtual address:
0001_0010_0011_0100_0101_0110_0111_1000_1001_1010_1011_1100 (or, in hexadecimal notation: 1, 2, 3, 4, 5, 6, 7, 8, 9, a, b, c), which when distributed in a 5-slice form, reads:
000100100_011010001_010110011_110001001_101010111100 (or: 24, d1, b3, 189, abc in hexadecimal notation)

The first slice of the address—A—is used as a pointer to retrieve a corresponding root address from a translation table base address (TTBA), held in a translation table base register (TTBR). The TTBA stores MSB slice entries to a node at the root level. The value of slice A is added to the returned address to produce a new pointer X0. The rest of the process is carried out on the page table. New pointer X0 is now used to point at address X0 in the page table top level pages data.

First, the MMU locates the top-level page table page, which stores all possible A slice entries. The physical address of this page is stored in a translation table base register (TTBR). In order to translate the address, the A slice index field (24 in the depicted example) is extracted from the virtual address and appended to the physical address (12c1000) from the TTBR. This produces a new pointer 202 to address (12c1024) that is used to retrieve another page in the page table (ff0200). The value of slice B (d1) is now added to that address to produce another, second, new pointer 204 (ff020d1). The second pointer is used to retrieve the next page in the page table (23cc000), and the value stored in slice C (b3) is now added to that address (23cc0b3) to produce a new third pointer 206. The third pointer 205 is used to retrieve the next page in the page table (1f04000), and the value stored in slice D (189) is added (1f04189), producing a fourth new pointer 208. Finally that last pointer 208 is used to retrieve the final page in the page table (ff04000) to which the value stored in slice D (abc) is appended, producing the final-physical address 210—ff040abc. Thus a virtual address is translated into a physical address.

A translation lookaside buffer (TLB) is used to improve the translation speed of virtual addresses. A TLB has a fixed number of slots containing page table entries and segment table entries; page table entries ap virtual addresses to physical addresses and intermediate table addresses, while segment table entries map virtual addresses to segment addresses, intermediate table addresses and page table addresses. The page table, generally stored in main memory, keeps track of where the virtual pages are stored in the physical memory. The TLB is a cache of the page table, representing only a subset of the page table contents. The MMU would first approach the TLB to determine whether a virtual address that has been previously accessed resulted in a translated physical address being saved in the TLB. If that fails (this is referred to as a "TLB miss"), a page table walk would be conducted.

Note that the values returned by the TTBR, obtained during a page table walk or from a TLB, are selected so that they have enough free bits (zeros) at their tails (the last portion of the address containing the LSB), so that when the value of the corresponding slice of the virtual address is appended, that value is clearly presented on the tail of the generated pointer (and eventually in the tail of the generated physical address).

More than one process may call the same virtual address, but these supposedly identical virtual addresses do not translate into the same physical memory because each process has its own process ID and the operating system includes that process ID in the virtual memory, thus possibly yielding different physical addresses. Similarly, when more than one operating system is involved this is taken care of so that ultimately there is only one tree that translates virtual addresses to unique physical addresses.

In a computing system that works with more than one operating system, the translation of a virtual address to a physical address may undergo two stages, taking the page table walk from one operating system to the other.

Figure 3A:
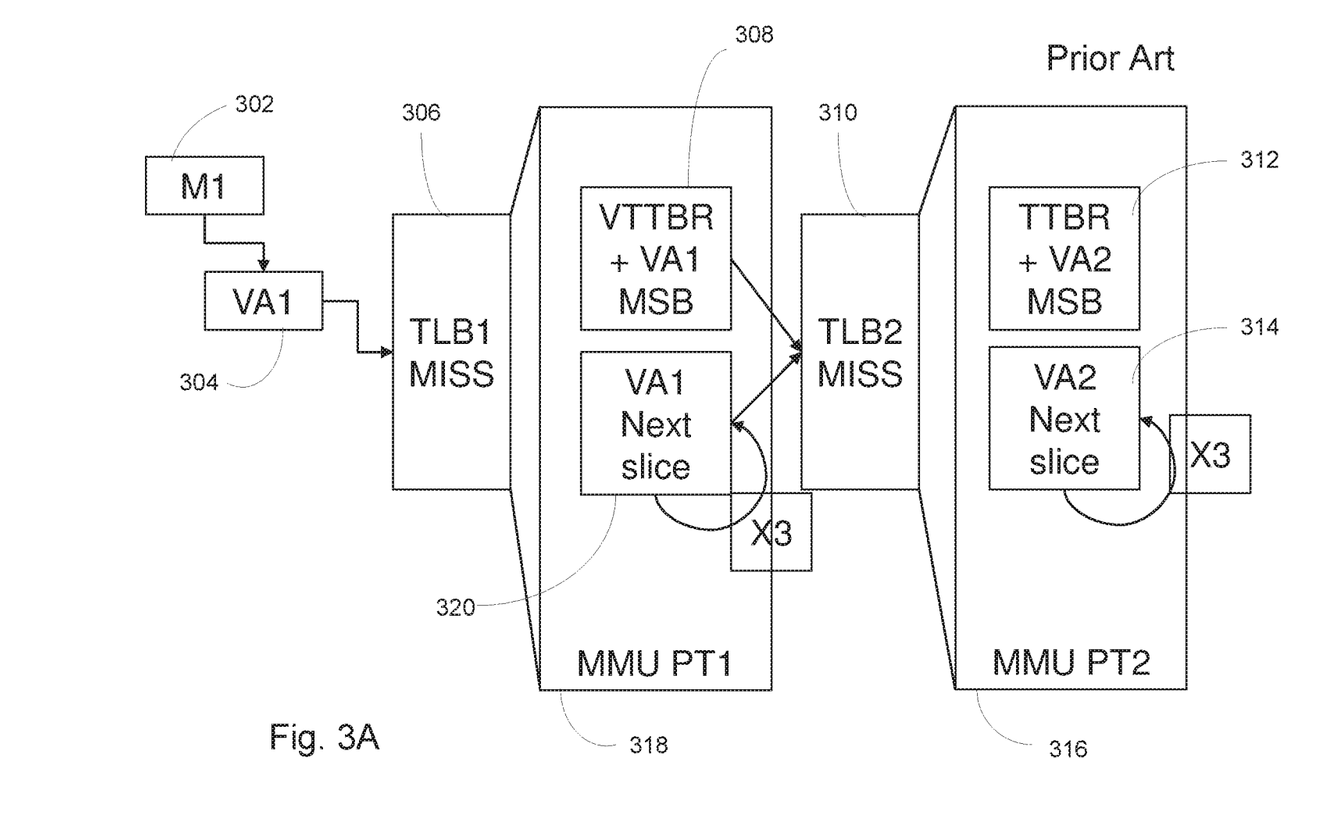
FIG. 3A illustrates the translation process of a virtual address into a physical address in a system that is operated by more than one OS (prior art)

FIG. 3A illustrates the translation process of a virtual address into a physical address in a system that is operated by more than one OS (prior art).

Master component M1 302, calls a virtual address VA1 304. The MMU first goes to check 306 TLB1 (of a first operating system), but it determines that the address has not yet been cached (a miss). The MMU then accesses the virtual translation table base register (VTTBR) for the first slice of virtual address VA1 (the MSB slice), and continues by repeatedly obtaining the remaining parts of the address 320 from the page table of that operating system (PT1). VTTBR is practically same in its nature as TTBR, but since it leads to a virtual address used by the second OS it is called VTTBR. If the translated address points to another virtual address, relating to a second, operating system, then similarly, TLB2 is accessed 310, and if that address was not previously accessed and cached in TLB2 (a miss) then the MMU of the second OS checks 312 in the TTBR of the second OS to obtain the MSB slice of the translated address, and further, recursively obtains 314 the next slices of the translated address from the page table of that operating system (PT2).

Translation of a virtual address to a physical address that undergoes two stages (passing from one operating system to another) is now considered.

Figure 3B:
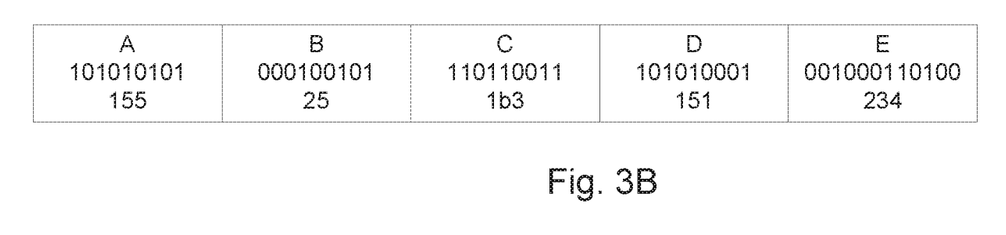
FIG. 3B illustrates translation of a virtual address to a physical address that undergoes two stages.

FIG. 3B illustrates translation of a virtual address to a physical address that undergoes two stages (passing from one operating system—referred to herein as the "hosting OS"- to another OS—referred hereinafter as "guest OS").

Each access to the page table carried out by the guest OS has to be translated as a virtual address in the hosting OA translation process. For example, consider a guest virtual address (GVA): aa8976751234 (hexadecimal)—a 6 bytes number.

The GVA, in binary values is: given by:
1010_1010_1000_1001_0111_0110_0111_0101_0001_0010_0011_0100

FIG. 3B shows the GVA viewed in 48 bit form (arranged in 5 slices, A, B, C, D and E). GVA in this form is given by: 155, 25, 1b3, 151, 234.

Figure 3C:
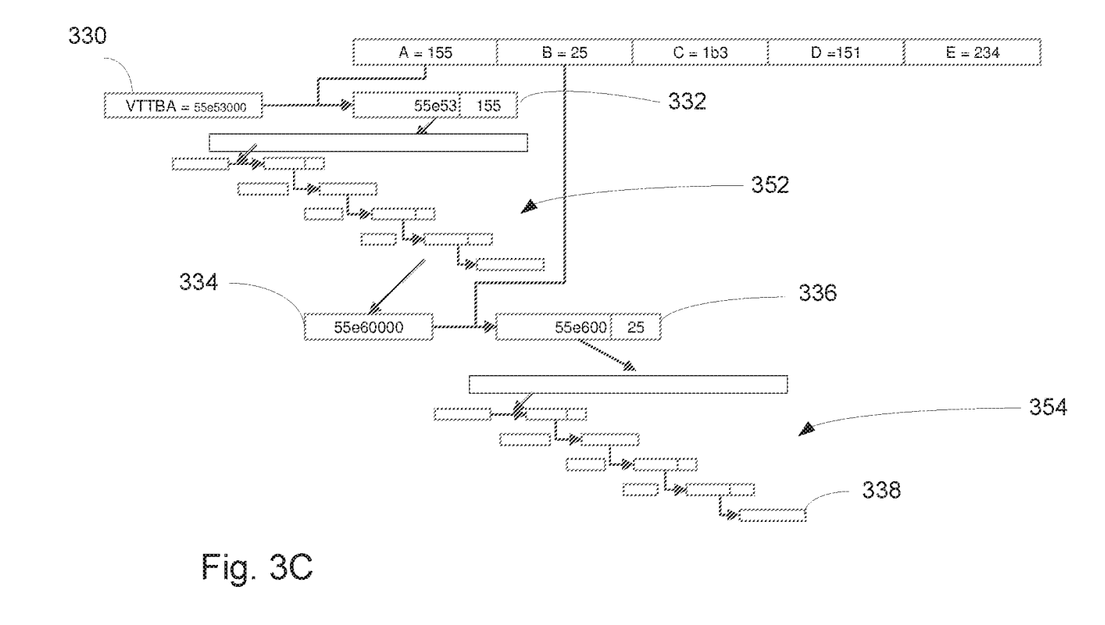
FIG. 3C illustrates a page table walk for translating a guest virtual address (relating to a computing system with a host operating system and a guest operating system)

The page table walk for translating a GVA is illustrated in FIG. 3C.

As this is a GVA the appropriate source for retrieving the corresponding root address is the VTTBR, which in this example 330 returns 55e53000. The MSB slice value of 155 is appended 332 to that address to produce the pointer address of 55e53155, and a five-step page table walk (corresponding to the five slices of the address) is conducted, which at the end produces the following address: 55e60000. That address is taken as a "root" 334, the value of slice B of the GVA is appended to it 336 to produce the address 55e6025, and another iteration 354 of a five step page table walk is conducted. This is repeated three more times, for the remaining three more slices (not shown in this figure for brevity), until a final, physical address is obtained.

Some embodiments of the present invention seek to provide a method and system for retrieving a virtual address that was previously mapped to a physical address. Such retrieval may be useful, for example, in debugging, where call to a physical address is considered by a debug tool, and it is desired to identify the virtual address that was called and eventually translated into that physical address.

Such information may be hard to obtain otherwise. A debug tool may be designed to record an execution of a software program for post-process debugging, but unless all virtual address calls and their corresponding physical address calls in that execution are recorded and saved—which would require a huge amount of information to be saved, it would not be possible to associate physical addresses with the virtual addresses that were previously translated into these physical addresses.

Therefore, in some embodiments of the invention a monitor may be assigned to monitor transmissions to and from the physical memory (e.g., using DRAM monitor or interface that leads to DRAM—such as AXI—monitor).

Figure 4A:
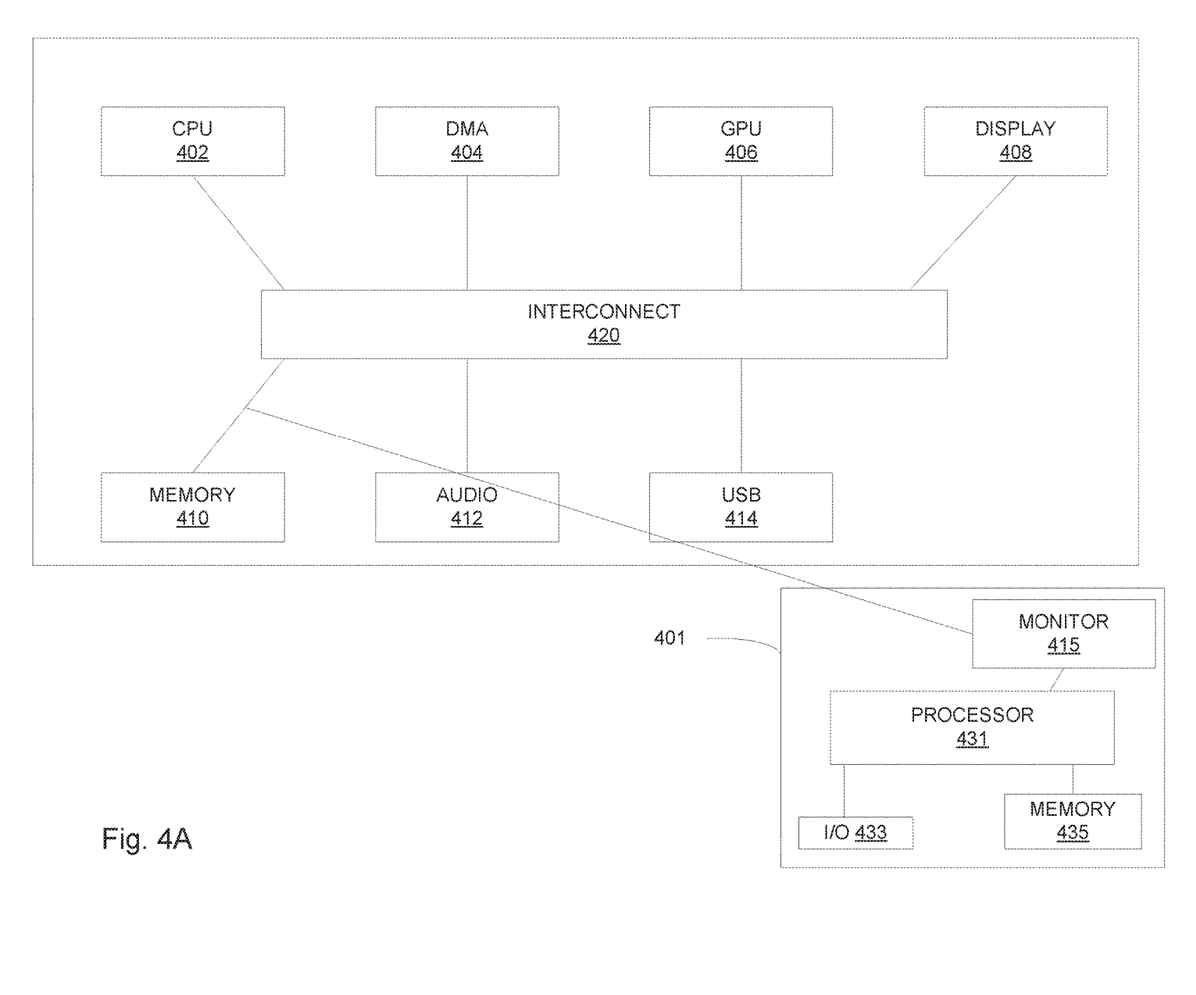
FIG. 4A illustrate a system for retrieving a virtual address from a physical address to which the virtual address was previously mapped to, according to some embodiments of the present invention.

FIG. 4A illustrate a system 401 for retrieving, for a system on chip (SoC), a virtual address from a physical address to which the virtual address was previously mapped to, according to some embodiments of the present invention.

The SoC may include an interconnect 420, which is typically used to interconnect the various devices of the SoC—in this example, central processing unit (CPU) 302, direct memory access (DMA) 404, graphical processing unit GPU 406, display 408, memory 410, audio 412 and a universal serial bus (USB) port—USB 414. The devices in this figure are merely examples of various SoC devices, whereas the overall design of the SoC in this figure may not necessarily present any valid SoC design. In some other embodiments of the present invention the monitored system may be a simulation or emulation of a device under test (DUT) that includes memory. System 401 for retrieving a virtual address from a physical address to which the virtual address was previously mapped to, according to some embodiments of the present invention, may also include a processor 431, an input/output interface 433, and memory 435. Other components may also be included.

Monitor 415 may be used to monitor transmissions to and from memory 410 over time.

Figure 4B:
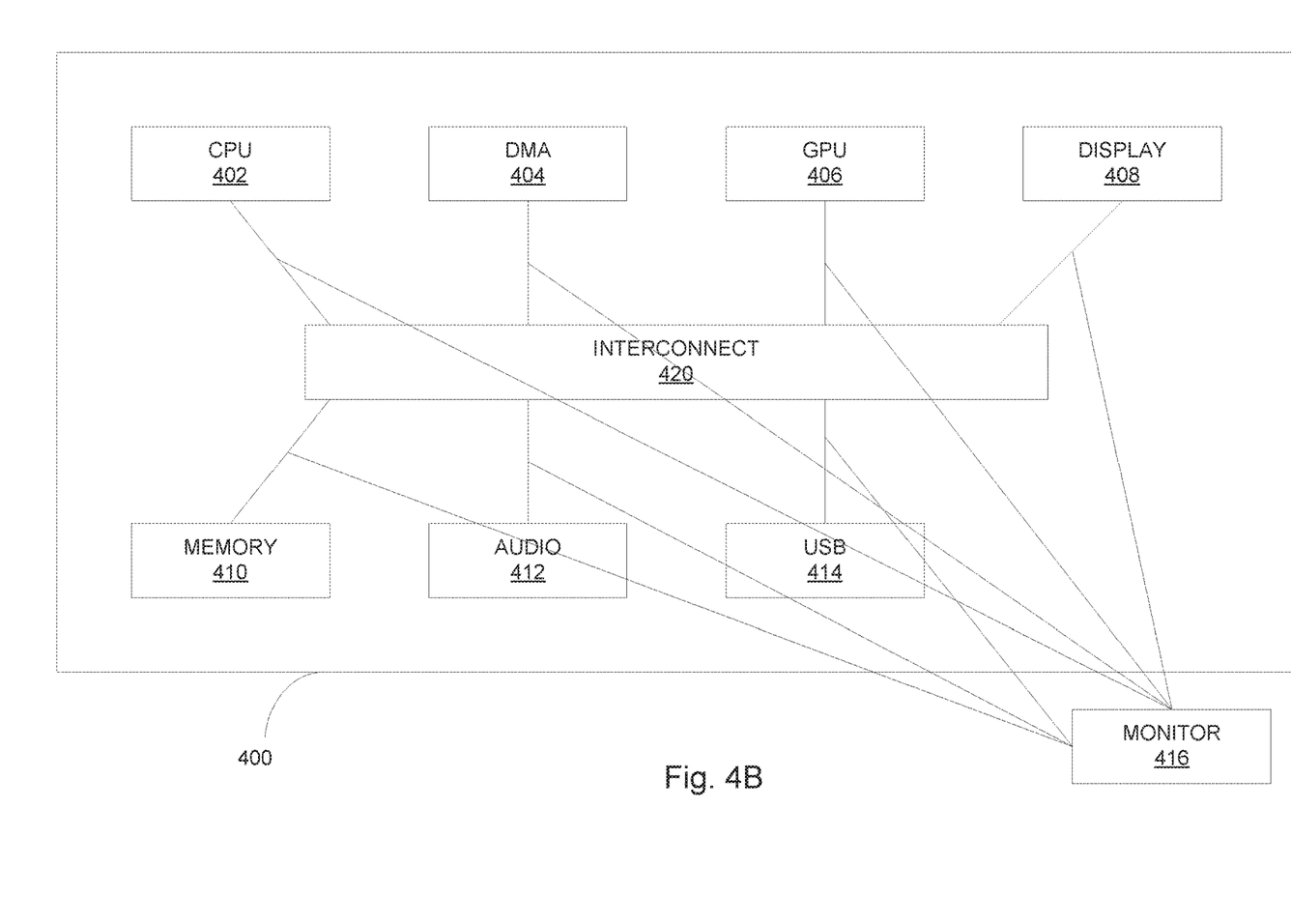
FIG. 4B illustrates a schematic design of a monitored system on chip (SoC), which is configured to retrieve a virtual address from a physical address to which the virtual address was previously mapped to, according to some embodiments of the present invention.

FIG. 4B illustrates a schematic design of a monitored system on chip (SoC), 400 which is configured to retrieve a virtual address from a physical address to which the virtual address was previously mapped to, according to some embodiments of the present invention.

A monitor 416 can monitor transmissions between IC components via the interconnect, and in particular monitor transmissions to and from memory 410.

In some embodiments of the present invention the monitor may be an interconnect validator device (IVD) that is typically used for validating the monitored interconnect transmissions and determine whether these transmissions are valid (e.g., whether a certain transmission that was communicated from one device was received by another device that was the intended recipient, and whether that communication was complete, etc.). Tracking of the interconnect transmissions is carried out by monitoring communication channels connecting the IC components via the interconnect.

Some embodiments of the present invention may be implemented in simulation or emulation of a device under test (DUT), as part of a verification process.

Figure 5:
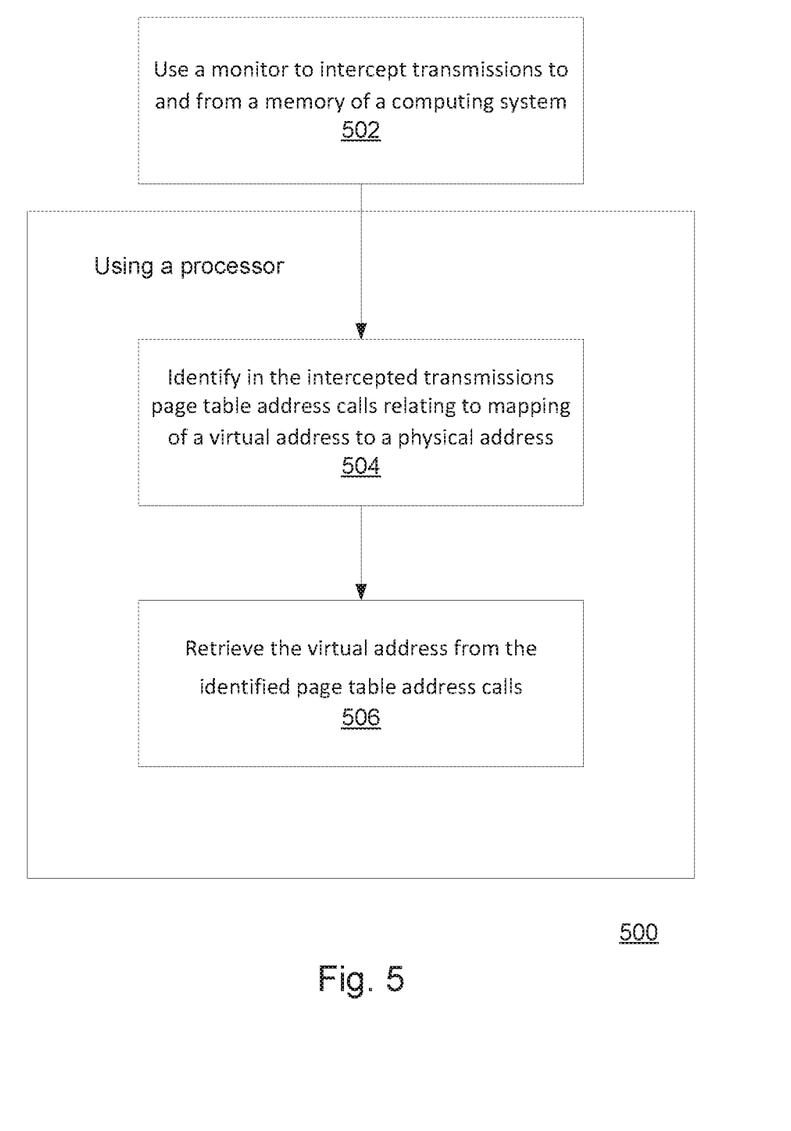
FIG. 5 illustrates a method of retrieving a virtual address from a physical address to which the virtual address was previously mapped to, according to some embodiments of the present invention.

A method of retrieving a virtual address from a physical address to which the virtual address was previously mapped to, according to some embodiments of the present invention, is illustrated in FIG. 5.

Method 500 may include using a monitor to intercept 502 transmissions to and from a memory of a computing system. Method 500 may also include using a processor, identifying 504 in the intercepted transmissions page table address calls relating to mapping of a virtual address to a physical address; and retrieving 506 the virtual address from the identified page table address calls.

According to some embodiments, retrieving of the virtual address from the identified page table address calls may include retrieving bits of the physical address from tails of least significant bits of the identified page table address calls.

In some embodiments retrieving of the virtual address from the identified page table address calls may be based on a chronological order of the identified page table address calls, knowledge of a number of page table steps that was required in mapping of the virtual address to the physical address, and knowledge of a translation table base register relating to the memory of the computing system.

In some embodiments the computing system may operate with more than one operating system, and the retrieving of the virtual address from the identified page table address calls may further include retrieving an address that is within an address range corresponding to a virtual translation table base register, and using that virtual translation table base register in retrieving the virtual address.

In some embodiments of the invention, retrieving of the virtual address from the identified page table address calls may include retrieving bits of the physical address from tails of least significant bits of every "n"th page table address call of the identified page table address calls, "n" being an integer that is equal to a number of slices in a form the virtual address is presented.

Retrieving a virtual address that was translated to a physical address from that physical address (hereinafter referred to as "reverse translation"), according to some embodiments of the invention, may require some a-priory knowledge. A system for performing the reverse translation, according to some embodiments of the invention, may need to know the relevant TTBR (and also VTTBR, in a system operated by more than one OS). It may also need to know the size of the TTBR (and also the size of VTTBR, in a system operated by more than one OS), and the number of translation steps in the same table (which is equal to the number of slices considered in the address format), and the different TTBRs that have been used as a result of having a system operated by different OSs (counting VTTBR as TTBR).

Reverse translation in a single OS environment, according to some embodiments of the present invention, may be carried out in the following manner:

A monitor may monitor the system memory over time to intercept transmissions to and from the memory during operation of the computing system (over a period of time), and page table address calls may be identified in the intercepted transmissions. In the context of the present invention "page table address calls" refers both to address calls that were generated during an actual page table walk or address calls that were extracted from a TLB. Given their chronological order it may be possible to identify among the identified page table address calls the final physical address and extract the virtual address that was translated into that physical address.

Following is an example, based on the page table walk described with connection to FIG. 2B.

Monitoring the memory during operation of the computing system may result in retrieving the following page table address calls (in chronological order, where the first call precedes the calls that follow):

a. 12c1024 (pointer 202 in FIG. 2A)—whose lowest 9 bits are: 000100100;

b. 1f02d1 (pointer 204 in FIG. 2A)—whose lowest 9 bits are 011010001;

c. 23ccb3 (pointer 206 in FIG. 2A)—whose lowest 9 bits are 010110011;

d. 1f04189 (pointer 208 in FIG. 2A)—whose lowest 9 bits are 110001001;

e. ff040abc ((pointer 210 in FIG. 2A, which was the translated physical address)—whose lowest 12 bits are 101010111100.

Thus, given that the TTBR, the page table extracting the values of the tails of the identified page table address calls—24, d1, b3, 189, abc—may yield the original virtual address of:

0001_0010_0011_0100_0101_0110_0111_1000_1001_1010_1011_1100 (or, in hexadecimal notation: 1, 2, 3, 4, 5, 6, 7, 8, 9, a, b, c) that was previously translated to the physical address ff040abc.

Reverse translation in a single operating system environment (hereinafter, also referred to as "single stage"), according to some embodiments of the present invention may involve reconstructing the original virtual address based on knowing the following:

1. TTBR value gives the root address of the page table.
2. An access to a memory range of [TTBR value . . . TTBR value+hierarchy size*entry size] is known to be part of the page table walk. The index of the entry in the table may be attributed to the appropriate virtual address bits. The value of retrieved in the access points to the next hierarchy of the table, allowing creating a node in the page.

There may be instances when performing the reverse translation of a physical address could lead to discovering more than one possible virtual address that may have translated to that physical address.

When the different possible virtual addresses are associated with different times, this may be overcome, by determining which of the possible virtual address was called at the time of interest.

In case the different possible virtual addresses were called concurrently, then an analysis may be needed to determine which of the possible virtual addresses is indeed the right virtual address that was actually translated at the time to the final physical address.

In some embodiments of the present invention, information on the retrieved virtual address and association to the physical address from which it was retrieved, may be saved in a table, similarly to TLB, so that if a reverse translation is needed for a physical address that had been previously reversely translated that would not be necessary anymore, and instead, that corresponding virtual address would be quickly retrieved form that table.

Some embodiments of the present invention may be embodied in the form of a system, a method or a computer program product. Similarly, some embodiments may be embodied as hardware, software or a combination of both. Some embodiments may be embodied as a computer program product saved on one or more non-transitory computer readable medium (or media) in the form of computer readable program code embodied thereon. Such non-transitory computer readable medium may include instructions that when executed cause a processor to execute method steps in accordance with examples. In some examples the instructions stores on the computer readable medium may be in the form of an installed application and in the form of an installation package.

Such instructions may be, for example, loaded by one or more processors and get executed.

For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method for retrieving a virtual address from a physical address in a memory of a computing system, to which that virtual address was previously mapped to, the method comprising:
    intercepting, by a monitor, transmissions to and from a memory of a computing system that is operating in at least a hosting operating system and guest operating system, and recording calls to physical memory addresses during execution of a software program;
    using a processor:
        identifying in the intercepted transmissions page table all address calls that relate to mapping one or more virtual addresses in the hosting operating system to a particular physical address;
        retrieving each of the one or more virtual addresses from the identified page table address calls based on a number of page table steps that was required in mapping of the virtual address to the particular physical address, and a translation table base register relating to the memory of the computing system, including retrieving an address that is within an address range corresponding to a virtual translation table base register that relates the virtual address in the hosting operating system to a virtual address in the guest operating system; and
        for each of the retrieved one or more virtual addresses mapped to the particular physical address, determining which of the retrieved one or more virtual addresses was called at a time of interest based on a chronological order of the identified page table address calls.

2. The method of claim 1, wherein retrieving of the virtual address from the identified page table address calls comprises retrieving bits of the physical address from tails of least significant bits of the identified page table address calls.

3. The method of claim 1, wherein retrieving each of the one or more virtual addresses from the identified page table address calls comprises retrieving bits of the particular physical address from tails of least significant bits of every "n"th page table address call of the identified page table address calls, "n" being an integer that is equal to a number of slices in a form the virtual address is presented.

4. The method of claim 1, wherein the computing system is selected from the group of systems consisting of system on chip, simulation of a device under test, and emulation of a device under test.

5. The method of claim 1, wherein the monitor is part of an interconnect validator device.

6. A system for retrieving a virtual address from a physical address in a memory of a computing system, to which that virtual address was previously mapped to, the system comprising:
    a monitor configured to intercept transmissions to and from a memory of a computing system that is operating in at least a hosting operating system and guest operating system, and record calls to physical memory addresses during execution of a software program; and
    a processor configured to:
        identify in the intercepted transmissions page table all address calls that relate to mapping one or more virtual addresses in the hosting operating system to a particular physical address; and retrieve each of the one or more virtual addresses from the identified page table address calls based on a number of page table steps that was required in mapping of the virtual address to the particular physical address, and a translation table base register relating to the memory of the computing system, including retrieving an address that is within an address range corresponding to a virtual translation table base register that relates the virtual address in the hosting operating system to a virtual address in the guest operating system; and for each of the retrieved one or more virtual addresses mapped to the particular physical address, determine which of the retrieved one or more virtual addresses was called at a time of interest based on a chronological order of the identified page table address calls.

7. The system of claim 6, wherein retrieving each of the one or more virtual address from the identified page table address calls comprises retrieving bits of the particular physical address from tails of least significant bits of the identified page table address calls.

8. The system of claim 6, wherein retrieving of the each of the one or more virtual addresses from the identified page table address calls comprises retrieving bits of the particular physical address from tails of least significant bits of every "n"th page table address call of the identified page table address calls, "n" being an integer that is equal to a number of slices in a form the virtual address is presented.

9. The system of claim 8, wherein the computing system is selected from the group of systems consisting of system on chip, simulation of a device under test, and emulation of a device under test.

10. The system of claim 6, wherein the monitor is part of an interconnect validator device.

11. A non-transitory computer readable storage medium for retrieving a virtual address from a physical address in a memory of a computing system, to which that virtual address was previously mapped to, having stored thereon instructions that when executed by a processor will cause the processor to:

intercept transmissions to and from a memory of a computing system that is operating in at least a hosting operating system and guest operating system, and record calls to physical memory addresses during execution of a software program;

identify in the intercepted transmissions page table all address calls that relate to mapping one or more virtual addresses in the hosting operating system to a particular physical address;

retrieve each of the one ore more virtual addresses from the identified page table address calls based on, a number of page table steps that was required in mapping of the virtual address to the particular physical address, and a translation table base register relating to the memory of the computing system, including retrieving an address that is within an address range corresponding to a virtual translation table base register that relates the virtual address in the hosting operating system to a virtual address in the guest operating system; and for each of the retrieved one or more virtual addresses mapped to the particular physical address, determine which of the retrieved one or more virtual addresses was called at a time of interest based on a chronological order of the identified page table address calls.

12. The non-transitory computer readable storage medium of claim 11, wherein retrieving each of the one or more virtual addresses from the identified page table address calls comprises retrieving bits of the particular physical address from tails of least significant bits of the identified page table address calls.

13. The non-transitory computer readable storage medium of claim 11, wherein retrieving of the one or more virtual addresses from the identified page table address calls comprises retrieving bits of the physical address from tails of least significant bits of every "n"th page table address call of the identified page table address calls, "n" being an integer that is equal to a number of slices in a form the virtual address is presented.

14. The non-transitory computer readable storage medium of claim 13, wherein the computing system is selected from the group of systems consisting of system on chip, simulation of a device under test, and emulation of a device under test.

* * * * *